Inventor
VAINO A. HOOVER

Patented Nov. 12, 1946

2,410,973

UNITED STATES PATENT OFFICE 2,410,973

COOLING OF DRIVING MOTORS OF SUBMERSIBLE PUMPS

Vaino A. Hoover, Los Angeles, Calif., assignor to Electrical Engineering and Manufacturing Corporation, Los Angeles, Calif., a corporation of California Application November 6, 1943, Serial No. 509,299

2 Claims. (Cl. 172—36)

This invention has to do, in general, with pumps of the type which are adapted to be submerged in the liquid to be pumped and which are driven by an electric motor which is completely enclosed in and forms part of the pump assembly. It is the usual practice to rely on the pumped liquid to cool the motors of such assemblies, because of the fact that cooling air may be supplied thereto only by separate conduits and other expensive means.

It is therefore the principal object of the invention to provide air cooling means for the completely enclosed driving motor forming part of a submersible pump device. A further object of this invention is to provide air cooling means, for electric motors forming part of submersible pump devices, which will include means for circulating the cooling air in order to remove the heat added thereto by the motor. A still further object is to provide an air cooling system for such electric motors in which the cooling air is positively directed in opposed, separated streams in order to effect improved cooling.

Other objects and features of novelty of the invention will be made apparent by the following description and the annexed drawings which, it will be understood, are only illustrative of the invention and impose no limitation thereon not imposed by the appended claims.

Figure 1:
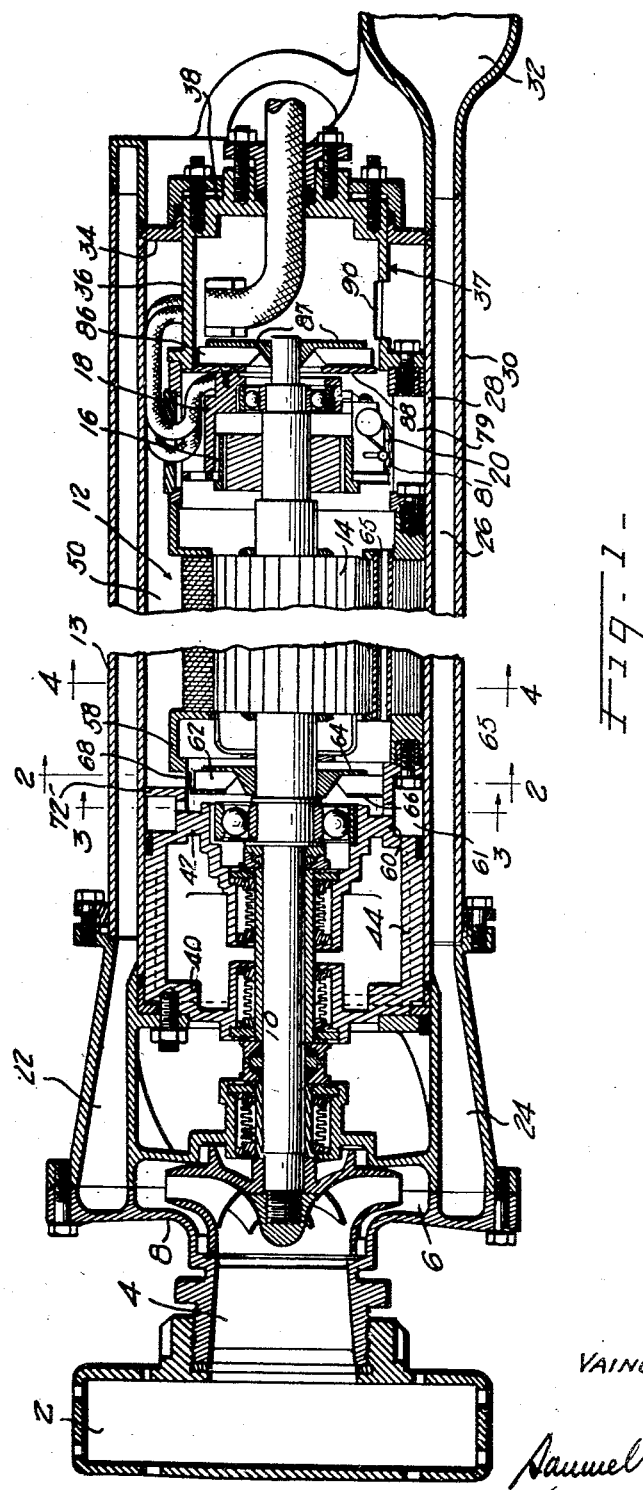
Figure 2:
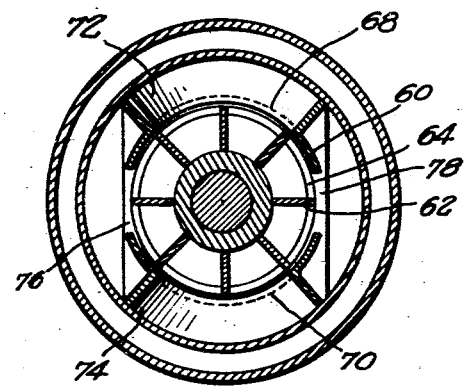
Figure 3:
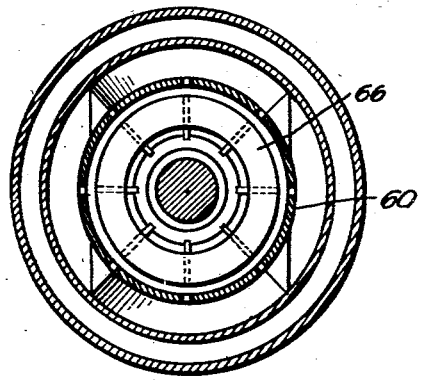
Figure 4:
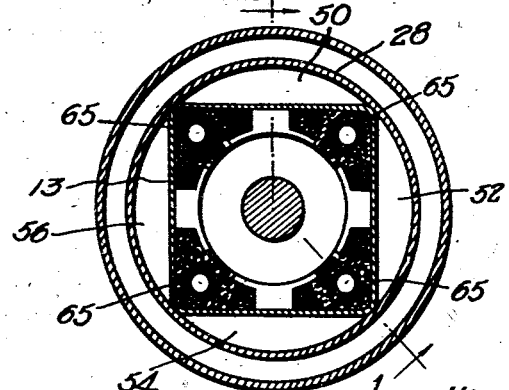

Referring to the drawings in which similar reference numerals refer to like parts, Fig. 1 is a longitudinal sectional view taken on the line 1—1 of Fig. 4 and showing a submersible pump device including an electric driving motor and air cooling means for such motor according to this invention, and Figs. 2, 3 and 4 are, respectively, sectional views taken on the lines 2—2, 3—3 and 4—4 of Fig. 1.

The submersible pump device illustrated in the drawings comprises the intake 2 which communicates through passage 4 with a chamber 6 within which an impeller 8 is rotatably mounted on the shaft 10 of an electric motor 12 having stator 13, armature 14, commutator 16, end bell 18 and brush assembly 20. The impeller 8 discharges into two circumferentially spaced volutes 22, 24 which, in turn, discharge into the annular passage 26 between the inner and outer walls 28, 30 of a cylindrical casing which surrounds and encloses the motor 12 and its associated parts and is connected to a delivery conduit 32. The open upper or delivery end of the pump and motor casing is closed by an annular ring 34 which is integrally, or otherwise permanently connected at its outer periphery to the inner surface of the inner wall 28 of the casing and, at its inner periphery, is centered and has a sealing fit with the cylindrical wall 36 of a housing 37 and is connected to the outer end of the commutator end bell 18 and has an integral end plate 38. At the drive end of the motor there is provided an oil chamber having spaced radial walls 40, 42 which surround and have sealing fit with the armature shaft 10 and which are integrally connected at their outer peripheries to a cylindrical wall 44 having sealing fit with the inner surface of the inner wall 28 of the motor casing. The various sealing means referred to are more fully described in my copending applications Serial No. 509,291, filed November 6, 1943, and Serial No. 509,298, filed November 6, 1943.

It will be seen from the foregoing description that the motor 12 is completely enclosed within the casing formed by cylindrical walls 28, 30 and the described end closures, and means are provided by this invention for cooling this enclosed motor. In accordance with the invention the inner casing member 28 is made of circular cross-section and the stator 13 is made of rectangular cross-section and of such size that the corners thereof tightly engage the inner surface of casing wall 28, as shown in Fig. 4 of the drawings, thus providing four crescent-shaped passages 50, 52, 54 and 56 which are located respectively between the four outer walls of the stator frame and the inner wall 28 of the casing. At the drive end of the motor the stator is rigidly connected to an end frame 58 to which is rigidly connected an annular flange 60 which extends axially from the motor end of the radial wall 42 of the oil chamber and which is of less diameter than the inner wall of inner casing member 28 whereby an annular chamber 61 is provided which is located outside of flange 60, inside of casing member 28, on the motor side of oil chamber wall 42, communicates with passages 52 and 56 and which is, as will be described hereinafter, blocked from communication with passages 50, 54. In the space within the flange 60 a fan 62 is mounted on the armature shaft 10, being disposed between the stator end frame 58 and the wall 42 of the oil chamber. This fan is provided on its face adjacent the motor with a shroud 64 which extends radially from the axis of the fan throughout the greater part of the radius thereof, leaving an open part at the outer periphery thereof from which air delivered by the fan is discharged axially of the motor, through the gap between the rotor and stator thereof, and through cooling-air passages 65 in the stator. On its impeller face the fan is provided with a second shroud 66 which, at its outer periphery, has a running fit with the inner surface of flange 60 and, at its center, is open to permit the intake of air. Adjacent the periphery of the fan the flange 60 is provided with two elongated, diametrically opposite openings 68, 70 which are aligned with and open into the opposite passages 50, 54 between the stator and the cylindrical casing. Adjacent these openings and surrounding them on the impeller side thereof are circumferentially-curved walls 72, 74 which form integral parts of the flange 60 and extend radially outwardly to the inner surface of casing wall 28, thereby serving to isolate the passages 50, 54, openings 68, 70 and the interior of the housing of fan 62 from the other parts of the annular chamber outside of flange 60. Also formed in flange 60 are two diametrically-opposite elongated openings 76, 78 which place the chamber within flange 60 in communication with the opposite passages 52, 56 which are disposed between opposite sides of the stator and the inner casing wall 28, whereby such passages communicate with the chamber within which the fan 62 is mounted.

As stated hereinbefore, at the commutator end of the motor there are provided the end bell 18, having the enclosing cylindrical cover 81, and aligned with which is the cylindrical housing 37, these being disposed concentrically within and supporting the casing 28 by attachment at one end to the stator frame 13. An annular chamber 79 is thus provided between the exterior of these parts and the inner casing member 28, and all four of the passages 50, 52, 54, 56 open into this chamber.

Mounted on the end of armature shaft 10, within the housing 37 is a fan 86 which, on its outer face is provided with a shroud 87 extending from the axis of the fan throughout the greater part of the radius thereof whereby it may discharge into the chamber 37. On the motor side of the fan an annular baffle plate 88 is attached to the outer end of commutator end bell 18 and has a central opening therein through which air may pass to the center of the fan. The cylindrical wall 36 of housing 37 has openings 90 formed therein which communicate the interior of chamber 37 with the annular chamber 79.

In the operation of the described invention, rotation of the armature shaft causes rotation of the two fans. Fan 62 at the drive end of the motor will draw in air from passages 52, 56 between opposite walls of the stator and the inner casing wall, and such air will flow into the chamber 61 outside of flange 60, through openings 76, 78 and into the fan chamber where it will be taken in at the center of the fan 62 and discharged at the periphery thereof, passing through the motor parts and the air gap between the stator and the rotor, and also passing through the openings 68, 70 in flange 60. From these latter openings, air delivered by fan 62 will pass through opposite passages 50, 54 along which it will flow to the commutator end of the motor where it enters the annular chamber 79 and from which it returns to the fan 62 through passages 52, 56. Air delivered by fan 62 to the interior of the motor will flow through the rotor-stator air gap and through the passages 65 in the stator into the end bell 18. The end bell casing 81 will keep this air from escaping and it will therefore be drawn through the central opening in baffle plate 88 into the center intake of fan 86, from the periphery of which it will be discharged into the passages 52, 56 for return to the fan 62.

The cooling of the motor will be effected principally by the flow of air through the rotor-stator air gap and the air passages in the stator and the heat transferred to the air by the motor will be removed by flow of this air through the outer passages 50, 52, 54, 56. The outer wall of each of these passages is constituted by the inner wall 28 of the annular conduit 26 for pumped fluid which will be cooled by the pumped fluid and will therefore take heat from the cooling air. It will be seen that the air stream in passages 50, 54 will flow from the drive end of the motor toward the commutator end thereof, while that in passages 52, 56 will flow in the opposite direction.

While I have described and illustrated one embodiment of my invention, it will be apparent to those skilled in the art that other embodiments, as well as modifications of that disclosed, may be made without departing from the spirit or scope of the invention, for the limits of which reference must be had to the appended claims. For example, the casing within which the motor is housed need not necessarily be circular in cross-section and, if desired, the longitudinal passages for cooling fluid may be formed otherwise than in the disclosed manner.

I claim:

1. An electric motor and pump assembly comprising a cylindrical casing, a motor within said casing, a plurality of circumferentially spaced, separated passages for cooling fluid extending longitudinally of the casing and motor and disposed internally of the casing and externally of the motor, a fan mounted on each end of the motor shaft adjacent the one end of said passages, housing means for one of said fans having delivery ports therein which communicate with only one group of said passages whereby a uni-directional flow of air therethrough is produced, and housing means for the second of said fans having ports which communicate with all of said passages whereby cooling air is delivered to said second fan through said one group of passages and is delivered by said second fan to the remaining passages.

2. An electric motor and pump assembly comprising a cylindrical casing, a motor of polygonal cross-section within the casing having longitudinal edges which abut the inner surface of said casing thereby providing a plurality of fixed separated passages for cooling fluid extending longitudinally of the casing and motor and defined by the respective side walls of the motor and the inner surface of the casing, a fan mounted on each end of the motor shaft adjacent the one end of said passages, housing means for one of said fans having delivery ports therein which communicate with only one group of said passages whereby a uni-directional flow of air therethrough is produced, and housing means for the second of said fans having ports which communicate with all of said passages whereby cooling air is delivered to said second fan through said one group of passages and is delivered by said second fan to the remaining passages.

VAINO A. HOOVER.